United States Patent [19]

Greenwood

[11] Patent Number: 4,524,641
[45] Date of Patent: Jun. 25, 1985

[54] CONTINUOUSLY-VARIABLE RATIO-TRANSMISSION

[75] Inventor: Christopher J. Greenwood, Preston, England

[73] Assignee: Leyland Vehicles Limited, Great Britain

[21] Appl. No.: 436,052

[22] Filed: Oct. 22, 1982

[30] Foreign Application Priority Data

Oct. 24, 1981 [GB] United Kingdom ............... 8132125

[51] Int. Cl.³ ..................... F16H 15/08; F16H 15/00; F16H 37/06
[52] U.S. Cl. ..................................... 74/691; 74/681; 74/200; 74/190
[58] Field of Search ............. 74/199, 200, 201, 190.5, 74/190, 191, 681, 690, 691

[56] References Cited

U.S. PATENT DOCUMENTS

| | | | |
|---|---|---|---|
| 3,570,317 | 3/1971 | Kraus | 74/200 |
| 3,739,658 | 6/1973 | Scheiter | 74/691 |
| 3,823,613 | 7/1974 | Abbott | 74/691 |
| 3,826,147 | 7/1974 | Sharpe et al. | 74/200 |
| 3,826,148 | 7/1974 | Magill | 74/200 |
| 3,828,618 | 8/1974 | Sharpe et al. | 74/200 |
| 4,186,616 | 2/1980 | Sharpe | 74/200 |
| 4,272,999 | 6/1981 | Perry | 74/200 |
| 4,275,610 | 7/1981 | Kraus | 74/200 |

FOREIGN PATENT DOCUMENTS 0006690 1/1980 European Pat. Off. .
2023573 1/1980 United Kingdom .

*Primary Examiner*—Lawrence J. Staab
*Assistant Examiner*—Michael David Bednarek
*Attorney, Agent, or Firm*—Thomas J. Greer, Jr.

[57] ABSTRACT

Two piston and cylinders 13, 15 and 16, 18 control the force reaction of a roller mounting in a continuously-variable-ratio transmission of the rolling traction type. A pressure control valve 23 controls the net force on the roller mounting by controlling the relative pressure in two pressure lines which include the cylinders. A flow dividing valve 22 equalizes the flows in the lines by feedback across two identical orifices 26, 27. Excessive displacements of the roller mounting (which could cause the rollers to run off their toroidal races) are controlled by ports 19, 20, which are restricted at respective ends of the permissible movement. The restriction causes a pressure build up in the cylinder which resists that threatening the original overshoot, while restricting the effect of the pressure control valve by virtue of the action of the orifices 26, 27 and flow dividing valve 22, and this also reduces the pressure which originally threatened the overshoot.

16 Claims, 5 Drawing Figures

CONTINUOUSLY-VARIABLE RATIO-TRANSMISSION

This invention relates to continuously-variable-transmissions of the rolling traction type and especially to hydraulic control circuits therefor.

Continuously-variable-ratio transmissions of this type comprise facing toroidal surfaces with at least one roller interposed therebetween. The ratio is changed by tilting the or each roller towards (or away) from the centre of one disc and away (or towards) the centre of the other. The ratio is not changed by directly twisting the axes of rotation of the rollers; instead it is changed indirectly, by imparting a translational movement to the axes of the rollers. This moves them out of an equilibrium position in which their axes intersect the axis of the transmission, and the rollers then automatically steer themselves back to an equilibrium position in which the roller axes intersect the axis of the transmission. This is explained in detail in an article in Motor, Dec. 28, 1968, entitled "Wheels within wheels" by Anthony Curtis.

The rollers transmit torque. Their mountings are subject to a reaction force, dependent on the torque transmitted. This reaction force is controlled, and hence torque is controlled, by hydraulic pressure in rams acting on the individual roller mountings or in a single pair of rams acting on a mechanical linkage connected to all the roller mountings. The hydraulic pressure is controlled for example by a microprocessor on the vehicle, in conjunction with various factors, to produce a desired characteristic for the driver's foot control.

It is of course essential to ensure that the rollers cannot run off the discs, and it is unwise to rely solely on the rollers always being controlled in accordance with a set microprocessor strategy. For this reason, means have been proposed for preventing overshoot of the rollers which operate irrespective of the control strategy. Mechanical stops have been provided for this purpose.

However, for various reasons it is desirable that hydraulic pressure controlling roller reaction force is related to the end loading that forces the input and output toroidal discs together. If a purely mechanical stop was used, a mismatch would occur between the end load pressure (which would be purely hydraulic) and the actual roller locating force (which would be hydraulic plus a mechanical supplement). If this happened, slippage of the rollers could occur.

For this reason, it has been proposed (United Kingdom Patent Application No. 2 023 753) to provide hydraulic stops to prevent roller overshoot: if excess movement of the rollers occurs, the rams for the roller mountings mechanically engage one of two further rams which create a high pressure urging the respective rams away from the extreme position. At the same time the higher pressure acts on the end loading device and so keeps it in step with roller reaction force. The Applicants are also aware of European Patent publication No. 0 006 690.

The invention provides a continuously-variable-ratio transmission of the rolling traction type having a hydraulic control circuit which includes: a pair of rams acting on a roller mounting to control roller reaction force; means to vary pressure in each of two hydraulic lines which pass through working chambers of the respective rams; and hydraulic stops arranged to cause a restriction in each line at the outlet from the corresponding ram at the extremities of movement of the roller mounting.

The pressure to resist overshoot of the rollers is built up in the rams rather than in a separate ram as hitherto. This results in a less cumbersome and simpler arrangement. Further, the use of hydraulic stops and individual hydraulic roller control is facilitated, since it is not necessary for an additional ram to be provided for each roller, as would have been necessary with the previously proposed system and this would have been very difficult because of packaging considerations. The fluid supply to the end loading device can be taken upstream of the rams, so that the increased pressure when the stops operate will also apply to the end loading device.

Advantageously, the means to vary pressure in each of the two hydraulic lines comprises valve means downstream of the rams to provide a variable restriction in each line and flow means upstream of the rams arranged to ensure that the relative flow rates in each line are maintained the same, as the settings of the valve means is varied. Preferably, the flow means comprises flow dividing means arranged to maintain an equal division of an input flow between the two lines as the valve means is varied. Because the relative flow in each line is maintained the same while the restrictions of the valve means are varied, those variations of the restrictions in each line result in variation of pressure in each line. When the hydraulic stops come into operation, for example, due to the valve means signalling a much higher pressure in one line than in the other, a two-fold effect takes place. First, pressure is built up in the ram towards which the roller is displaced by virtue of the restriction of flow out of that ram, and this opposes the higher pressure in the other ram which originally threatened the overshoot. Secondly, reduced flow from the ram on which the stop has come on (due to leakage due to the high pressure) results in the flow dividing means increasing the flow to that ram (so the stiffness of the stop is increased) and reducing it to the other, thereby reducing the flow to the valve means and reducing its effect. These two effects return the roller away from the extreme position.

Advantageously, the flow dividing means is arranged to equalise the fluid flow through each line by sensing the pressure differences across identical orifices arranged in the lines between the rams and the valve means.

Advantageously, the outlet in each ram chamber is at least partially closed by the ram head it the respective extremities of movement of the roller mounting. The dimensions of the chambers and ram heads may be such that the chambers at least partially exhaust by permitting fluid flow across the ram heads at the position where the hydraulic stops come into operation. For example, the ports may open into grooves extending around the walls of the chambers in a circumferential direction, the length of the grooves in an axial direction being equal to or greater than the lengths of the ram heads, to permit the fluid flow across the pistons.

The head of each ram head may carry a coaxial cylinder in which it travels as to provide damping for the ram.

The chambers of the rams for the roller mounting are advantageously in communication with the corresponding chambers of the rams for the mountings of other rollers of the same set, that is, rolling between the same toroidal discs. Since the corresponding rams will all be in communication, the resultant hydraulic pressure at each of the roller mountings will be the same and the reaction force of each roller will be the same. The same principle can be extended to a transmission with a double set of rollers, that is, one master pair of rams can control slave rams for all the other rollers of both sets.

Alternatively, one pair of rams may be employed, and all the rollers may be controlled via a mechanical linkage. It is to be understood that the term ram covers an arrangement where the ram head seals against the ram (i.e. a piston and cylinder) as well as an arrangement where the ram chamber has the seal and the ram rod moves relative to it (i.e. a displacement ram). Further one double-acting ram may be used instead of the pair of rams referred to.

A hydraulic control circuit for a continuously-variable-ratio transmission will now be described, by way of example, with reference to the accompanying drawings, in which.

Figure 1:
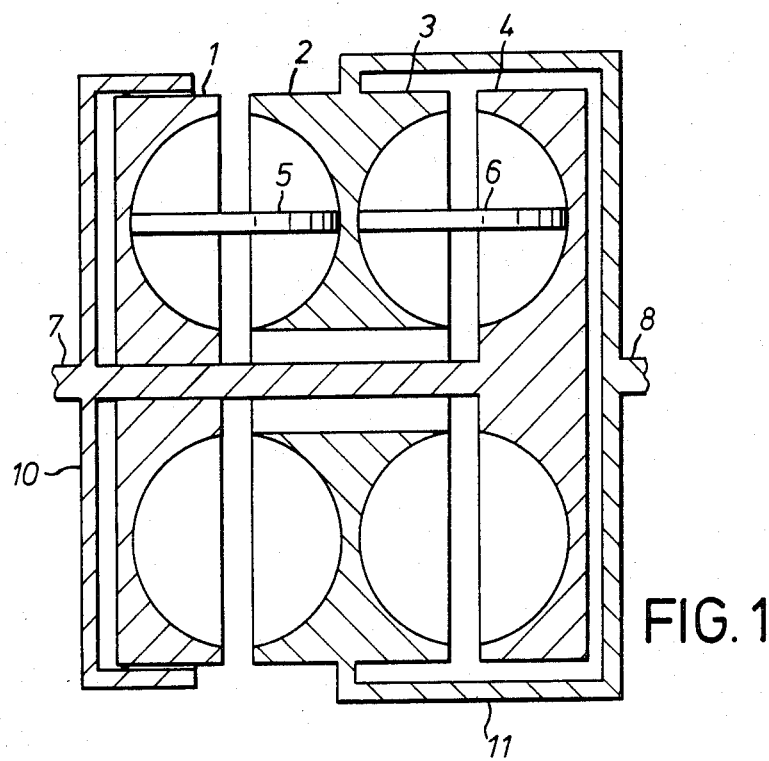
FIG. 1 is a diagrammatic view of the continuously-variable-ratio transmission.
Figure 5:
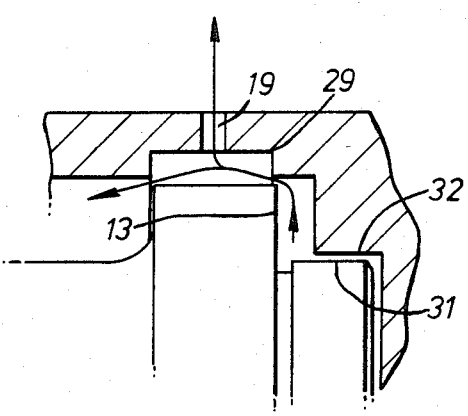

FIG. 5 is an enlarged view of a part of an alternative form of piston-and-cylinder Referring to FIG. 1, a continuously-variable-ratio transmission of the rolling traction type comprises two pairs 1, 2 and 3, 4 of toroidally recessed discs between each of which three rollers are mounted for rotation. Only one such roller 5, 6 can be seen between each pair of discs in FIG. 1. Discs 1 and 4 rotate with input shaft 7 and discs 2 and 3 rotate with output shaft 8 via a hollow sleeve 11. A bearing 9 enables the end loading pressure between the pairs of discs 1, 4 and 2, 3 to be varied. Hydraulic pressure is applied between the rear of disc 4 and abutment 10, which do not of course rotate relative to each other. Abutment 10 may form a cylinder in which disc 4 moves as the piston.

The ratio of the transmission is varied by tilting the rollers 5 and 6, which as can clearly be seen from FIG. 1 will alter the speed of rotation of the discs 1, 4 relative to the discs 2, 3. The axes of the rollers illustrated in FIG. 1 are initially in the plane of the paper and, as described previously, they are not tilted by directly twisting them about their axes, but by displacing them (at least those illustrated in FIG. 1) into or out of the plane of the paper which causes the rollers to steer up or down the toroidal surfaces until they come to a new equilibrium position, which obtains when the axes of the rollers intersect the axes of the shafts 7 and 8.

The continuously-variable-ratio transmission output 8 may be combined in known manner with a direct (but contra-rotating) input from the same prime mover that rotates shaft 7 to produce two "regimes" of operation, a first where the combined output varies from reverse, geared neutral and low forward ratios, and a second where the output varies from low to high forward ratios. (See for example, the United Kingdom Patent Specification referred to).

Figure 2:
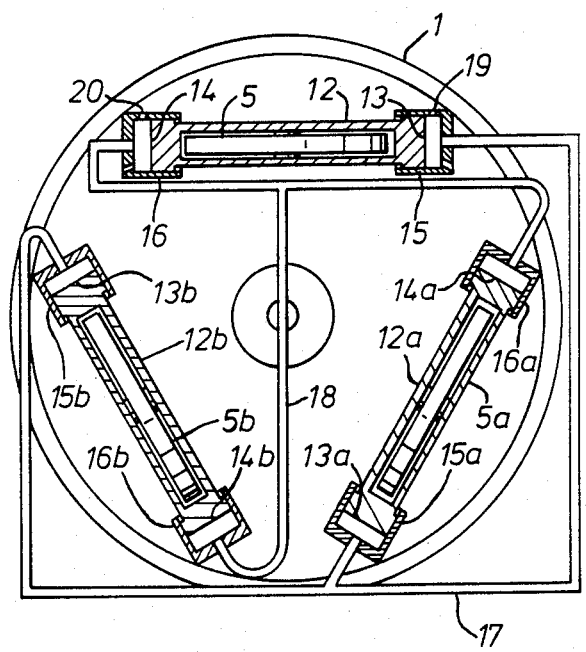
FIG. 2 is a diagrammatic view of the rollers and the rams for the roller mountings of the transmissions of FIG. 1.

FIG. 2 shows one set of rollers 5, 5a and 5b seen in the direction of the transmission with the toroidal discs removed. There is a similar set between the discs 3, 4. The rollers are rotatably mounted in carriers 12, 12a, 12b, the ends of which are pistons 13, 13a, 13b and 14, 14a, 14b movable in cylinders 15, 15a, 15b, 16, 16a, 16b, to form pairs of rams. The cylinders are rigidly mounted in a spider fixed with respect to the casing of the transmissions. The pistons 15 and 16 are master pistons and communicate with slave pistons 15a, 16a, 15b, 16b by lines 17, 18. The rollers of the other set have similar pistons and cylinders which are also controlled by the master piston and cylinders 15 and 16.

The invention relates to the provision of hydraulic stops 19, 20 for the master pistons 15,16 and hence for the rollers 5, 5a, 5b, 6, 6a, 6b, via the slave pistons. The hydraulic stops limit movement of the rollers, and hence prevent them being displaced to a position where the rollers could run off the discs as they tried to seek an equilibrium position.

Figure 3:
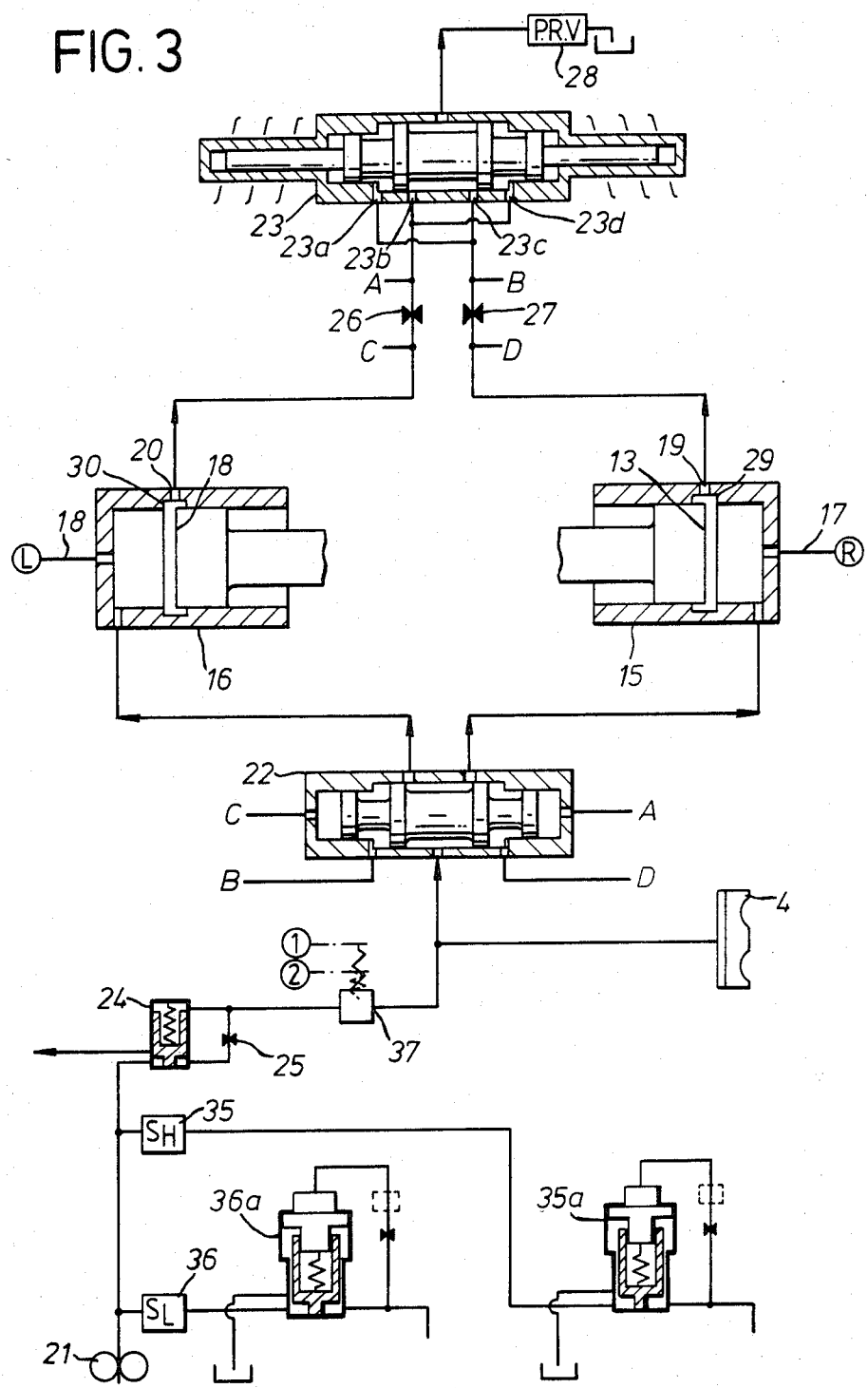
FIG. 3 shows the hydraulic control circuit connections to the master rams.
Figure 4:
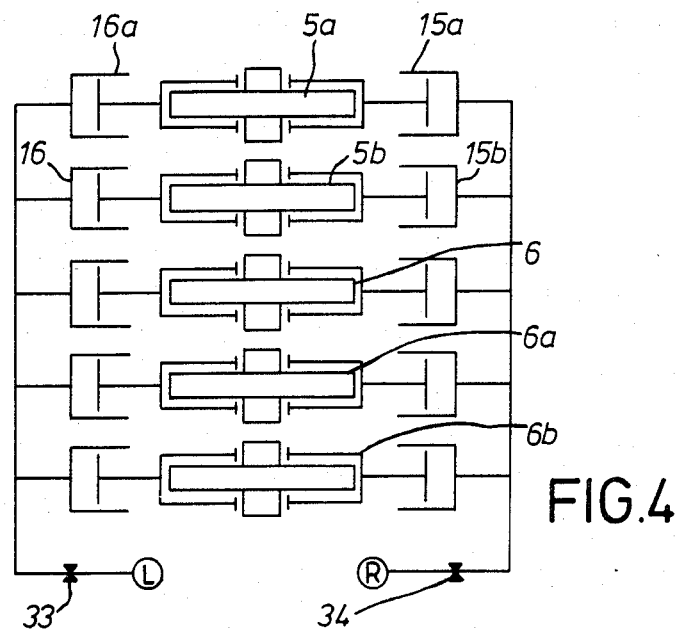
FIG. 4 shows the hydraulic control circuit connections between the rams.

The operation of the hydraulic circuit will now be explained with reference to FIGS. 3 and 4 which show the hydraulic control circuit of the transmission. The master piston and cylinders 15, 16 only are shown in FIG. 3, the connections to the slave piston-and-cylinders being shown in FIG. 4. Further, the roller 5 and the carrier 12 for the roller have been omitted from FIG. 3.

The hydraulic control circuit essentially consists of a pump 21 which supplies oil to the circuit, a flow dividing valve 22 which equalises to oil flow through each line, the cylinders 15 and 16, and a pressure control valve 23.

The supply pump 21 is a positive displacement engine driven pump. A flow control valve 24 meters this oil flow, producing a constant rate of flow irrespective of engine speed and hence pump output. This is done by monitoring the pressure drop across orifice 25.

The pressure control valve 23 has a spool which is moved by a solenoid (not shown) to partially block ports 23b, 23c. The valve acts to vary the pressures in the lines in conjunction with flow dividing valve 22. The spool of this valve is subject to the pressure differences across orifices 26, 27 by virtue of lines (not shown) which connect points A to A, B to B etc. When the pressure control valve moves one way and increases the valve opening on one line and reduces it on the other, if the flow dividing valve was not present, flow would simply increase on the line with the larger valve opening and pressure would not vary between the lines. The flow dividing valve 22 alters its relative size of port opening so that the total impedance to flow on each line is the same, and thus so that flow divides equally between the lines. Because the flow along each line is equal, the variable port openings produced by valve 23 are translated into variable pressures. The pressure control valve 23 is thus movable to change the relative pressures in the lines, in conjunction with flow dividing valve 22. The latter works in the following way. The spool of the flow dividing valve moves if the pressure drop across one orifice 26, 27 exceeds that across the other. Since the orifices are identical, this means that the spool moves if one flow rate exceeds the other. It moves to equalise any flow disparity.

Because of the lands on the spool of the solenoid valve 23, any pressure difference between the lines is fed back to the spool and exerts a net force on the spool. The spool comes to rest when the electromagnetic force exerted by the solenoid on the spool balances the force on the spool due to the pressures in the lines acting on the lands of the spool.

A pressure relief valve 28 maintains the pressure in the system slightly above atmospheric pressure, to prevent air leaking into the system.

The solenoid valve 23 is controlled by an on-board microprocessor, which also controls engine speed.

To obtain a change of ratio, the microprocessor changes the electric signal on the solenoid valve 23, causing the spool to move. The relative pressures in the lines change, and the pistons are subjected to a net force in one direction. Other factors being equal, the roller mounting moves in one direction and the rollers steer to a new attitude. The same pressures are transmitted to the respective ends of all the rollers since points L and R connect with the slave pistons as shown in FIG. 4, orifices 33 and 34 providing damping. The increased force on the roller mountings is also transmitted to the end loading device (the device for forcing the toroidal discs together) because this is upstream of the pressure control valve.

In acordance with the invention, the ports 19 and 20 act as hydraulic stops. Suppose for example the spool of its solenoid valve 23 moves sharply to the right and causes a sharp rise in the left hand pressure line. The roller mounting will be forced to the right and will restrict the port 19 (by restricting a groove 29 through which the port opens into the cylinder: port 20 opens into a similar groove 30). Consequently, oil flow reduces out of the cylinder 15 and the pressure rises in the cylinder 15, countering the high pressure in the left hand cylinder. In addition, because of the high pressure, oil exhausts across the piston and oil leaks out of the right hand line. (It could be designed to occur elsewhere, upstream of the orifice 27). The flow dividing valve 22 attempts to maintain equal flow across orifices 26, 27, and hence diverts more oil into the right hand line and out of the left hand line (the pressure difference across CA exceeds that across DB and the spool of the flow dividing valve moves to the right). (In fact, as the hydraulic stops come on (i.e. the orifice 19 becomes more restricted), the flow dividing valve becomes unable to keep the flow across the orifices 26, 27 the same, although it is still attempting to do so.) The restricted flow to the left hand line will tend to reduce the pressure in that line and hence reduce the effect of the solenoid valve. These two factors, the reduced effect of the solenoid valve, and the build-up of pressure in the cylinder 17 as the port 19 is closed, cause the right hand motion of the roller to be resisted and gradually reversed, until the piston is off the hydraulic stops. An additional factor is that the increased flow to the right hand line makes the hydraulic stop stiffer than it would otherwise be.

The increased pressure is generated in the ram, making the construction less complicated than hitherto proposed solutions, and permitting the use of hydraulic stops with individual hydraulic roller control. Also, the increased pressure is fed to the endloading device since this is arranged upstream of the flow dividing valve. It should be noted that the hydraulic stops are in the master pistons only, not in the slaves.

High and low regime clutches may be selected by solenoid valves 35, 36 (FIG. 3); valves 35a and 36a control the engagement of the clutches. A two position relief valve 37 is incorporated downstream of the flow control valve. When set to low pressure position, the clutches operate at the pressure generated by the flow control valve 23. The second high pressure setting is used during a synchronous change of regime when both clutches are engaged. The local high pressure produced maintains the clutches against engine torque with zero demand on the solenoid valve.

In a modification of the invention, the axial length of the piston is slightly less than that of the groove 29 (FIG. 5), and this provides a more controlled leakage at the piston as the stops come on. The piston 13 has a smaller diameter head 31 on it which moves in a tight-fitting bore 32. This produces damping in the manner described in United Kingdom Patent Specification No. 1 032 004.

The operation of this form of the invention is the same as before in that leakage takes place from the cylinder as the stops come on and the orifice 27 downstream of it signals the flow dividing valve to divert flow to that line from the other.

The piston may be provided with an O-ring which tends to seal against a part of the cylinder as the stops come on. This will tend to increase the stiffness of the stops.

Flow control orifice 25 need not be positioned as in (FIG. 3). Instead, it may be positioned immediately upstream of pressure relief valve 28. In this case, the flow to the circuit is increased by any loss at the piston, as well as compensating for increased leakage, as the oil temperature rises.

As a further alternative, the pistons 15, 16 may operate all the rollers by means of a mechanical linkage.

As a further alternative, the constant flow on each line could be provided by separate pumps, rather than using the flow dividing valve.

I claim:

1. A continuously-variable ratio transmission of the rolling traction type having at least one pair of toroidally-recessed discs with rollers interposed on mountings therebetween, and having a hydraulic control circuit, said transmission comprising a pair of hydraulic rams for exerting forces on one of said roller mountings in two opposite directions to displace said rollers and to balance any roller reaction force; each of said hydraulic rams having a cylinder defining a working chamber and a head, said hydraulic control circuit including a hydraulic line passing through the working chamber of each of said hydraulic rams, there being two of said hydraulic lines, one hydraulic line for each of said hydraulic rams, means for varying pressure in each of said two hydraulic lines for producing said forces exerted on said one roller mounting; and each of said hydraulic rams having a hydraulic end stop arrangement operating when said one roller mounting approaches an end position to restrict the corresponding one of said hydraulic lines only, thereby to increase substantially the pressure within said one corresponding hydraulic line causing said forces strongly to resist further roller displacement towards said end position.

2. A transmission according to claim 1, wherein said pressure-varying means including flow means acting on said two hydraulic lines to insure substantially equal flow therethrough during both normal control operation and hydraulic end stop function.

3. A transmission as claimed in claim 1 wherein there is an outlet in each ram working chamber which is at least partially closed by said hydraulic ram head at the respective extremities of movement of said one roller mounting, thereby causing said restrictions in said hydraulic lines for the hydraulic end stop operation.

4. A transmission as claimed in claim 3, wherein the dimensions of said ram chambers and said ram heads are such that said ram chambers at least partially exhaust by permitting fluid flow across said ram heads at said respective extremities.

5. A transmission as claimed in claim 4, wherein said outlets open into grooves extending around walls of said ram chambers in a circumferential direction, said grooves being of a length of axial direction equal to or greater than the lengths of said ram heads, to permit the said fluid flow across said ram heads.

6. A transmission according to claim 1, wherein each ram head carries a coaxial piston which is so sized relative to a respective cylinder in which it travels to provide damping for said hydraulic ram.

7. A transmission according to claim 1, wherein there are other pairs of hydraulic rams for mounting of others of said rollers acting between said toroidal recessed discs, said other pairs of hydraulic rams also having working chambers, and said working chambers of said hydraulic rams for said one roller mounting being in communication with said working chambers of said other pairs of hydraulic rams.

8. A transmission as claimed in claim 7, wherein there are two pairs of toroidal-recessed discs facing each other with rollers interposed therebetween, said pairs of toroidal-recessed discs reacting against each other, said working chambers of said hydraulic rams of the first mentioned roller mounting being in communication with working chambers of the corresponding hydraulic rams for all of the other roller mountings.

9. A transmission according to claim 1, wherein said means for varying pressure in each of said two hydraulic lines includes valve means downstream of said hydraulic rams to provide a variable restriction in each hydraulic line.

10. A transmission according to claim 2, wherein said means for varying pressure in each of said two hydraulic lines includes valve means downstream of said hydraulic rams to provide a variable restriction in each hydraulic line.

11. A transmission according to claim 10, wherein said flow means include flow dividing means arranged upstream of said hydraulic rams for maintaining substantially equal division of an input flow between two said hydraulic lines as said valve means is varied.

12. A transmission according to claim 11 wherein said flow dividing means is arranged to equalize fluid flow through each hydraulic line by sensing pressure differences across identical orifices arranged in said hydraulic lines between said hydraulic rams and said valve means.

13. A transmission according to claim 12, wherein said flow dividing means includes a valve having a valve member movable to restrict one of two ports connected by said hydraulic lines to said hydraulic rams, and said valve member being subject to fluid pressures on each side of both of said orifices.

14. A transmission according to claim 13, wherein said valve means include a single valve, and pressure difference in said hydraulic lines being fed back to said valve member of said flow dividing means valve by virtue of lands on said valve member.

15. A transmission according to claim 11, together with a flow control valve for insuring constant flow to said flow dividing means by monitoring pressure drop across an orifice.

16. A transmission according to claim 1, wherein the each pair of hydraulic rams are integral with respective roller mountings without any intermediate mechanical linkage.

* * * * *